Sept. 7, 1937.  J. A. ANTONELLI ET AL  2,092,237
OIL-COOLED GREASE RETAINER
Filed Aug. 26, 1935
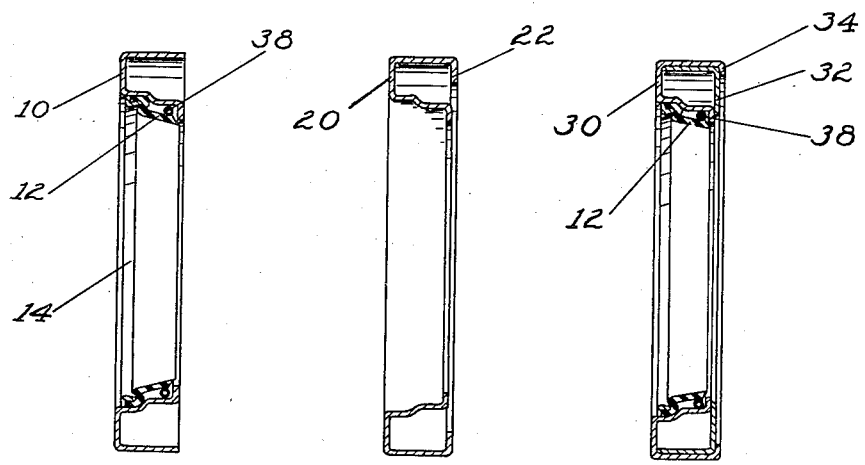
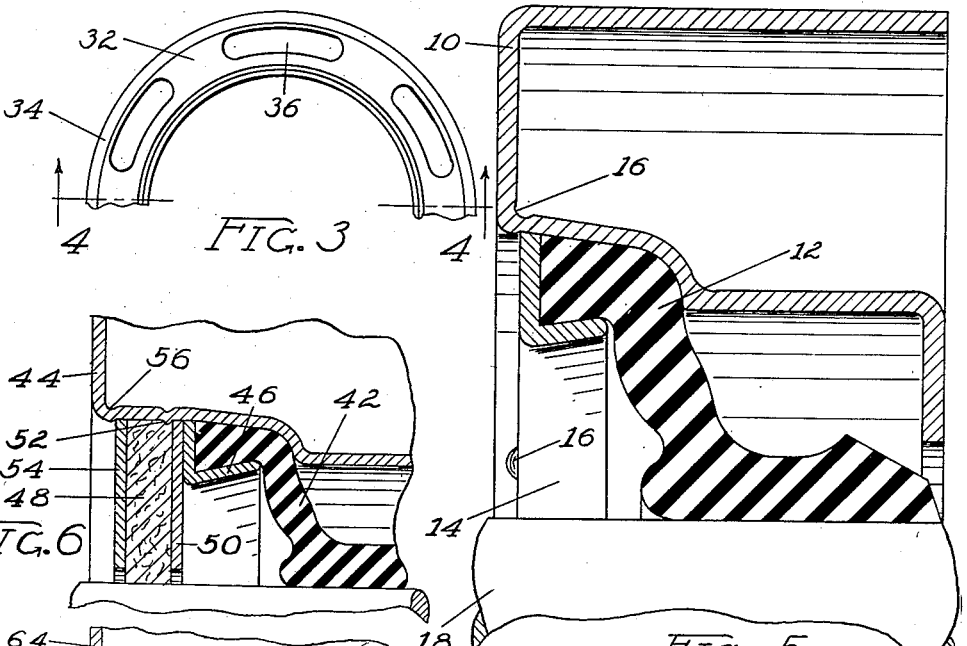
JOSEPH A. ANTONELLI
THOMAS O. KOSATKA
INVENTORS
PER Albert J. Fihe
ATTORNEY Patented Sept. 7, 1937

2,092,237

UNITED STATES PATENT OFFICE 2,092,237

OIL-COOLED GREASE RETAINER

Joseph A. Antonelli, Chicago, and Thomas O. Kosatka, Cicero, Ill., assignors to Victor Manufacturing & Gasket Company, Chicago, Ill., a corporation of Illinois Application August 26, 1935, Serial No. 37,826

13 Claims. (Cl. 288—1)

This invention relates to an improved oil-cooled grease retainer or oil seal, and has for one of its principal objects the provision of a very simple yet efficient device for sealing lubricants in housings around rotating shafts or the like.

One of the important objects of this invention is to provide an oil seal or grease retainer which includes the usual pliant diaphragm composed of leather, synthetic rubber or some other similar material and which further includes a novel means for supporting the diaphragm in position, as, for example, in an axle housing or the like.

An important object of the invention is to provide a grease retainer of this type which can be made with one open face so that the oil or grease which it retains in an axle housing or the like will work or splash into this open face, thereby keeping the grease retainer assembly cooler than would ordinarily be possible.

Another object of the invention is the provision of an improved grease retainer structure wherein advantage is taken of the natural resiliency of the packing element to provide a combination support and fastening seal for that edge of the same which is mounted in the metal housing.

A still further object of the invention is to provide an oil-cooled grease retainer, the housing of which can be made in one or two pieces as desired, but which, in either event, will be substantial, easily installed without danger of warping or collapse, and which will, at the same time, allow of a free circulation of oil or other liquid to be sealed in and around the housing itself, thereby keeping the entire structure at a lower operating temperature than has heretofore been thought possible.

Other and further important objects of the invention will be apparent from the disclosures in the accompanying drawing and following specification.

The invention, in a preferred form, is shown in the drawing and hereinafter more fully described.

In the drawing:

Figure 1 is a sectional view of the improved oil-cooled grease retainer of this invention.

Figure 2 is a sectional view of a modified form, showing a slightly different housing and with the diaphragm removed.

Figure 3 is a plan view of a further modification of the grease retainer of this invention.

Figure 4 is a section taken on the line 4—4 of Figure 3.

Figure 5 is a greatly enlarged section, showing a form of housing such as that illustrated in Figure 1, but with a slightly different type of packing or diaphragm therein.

Figure 6 is a sectional view of a further development of the invention including a dust seal.

Figure 7 is a modified form of dust seal.

As shown in the drawing:

The reference numeral 10 indicates generally the metal shell or casing of the improved grease retainer of this invention, the same being channel-shaped and in most cases open at one face. The inner wall of the casing or shell is shaped to conform somewhat to the packing or diaphragm and has an inner face and offset portion which forms a seat into which a corresponding portion of the packing 12 is fitted.

As best illustrated in Figure 5, this portion of the packing is first placed into a metallic ring 14 into which it is held by the innate resiliency of the packing and then this ring with the packing is fitted into position in the offset portion or seat of the casing 10 after which indentations 16 are struck outwardly from corresponding portions of the shell or casing so as to retain the ring 14 together with the packing in desired position. This portion of the packing also then acts as a gasket or sealing element to prevent leakage of oil or grease at the joint between the packing and the shell.

The shell itself is made with a slightly oversized fit so far as the housing is concerned, and this provides for an oil seal at its periphery, and the packing or diaphragm 12 is so constructed that an efficient oil seal about the shaft 18 results.

In Figure 2 is shown a slightly modified form of casing or shell 20, the same differing from the shell 10 only in that it has an overhanging lip or bead 22 which provides additional strength on the outer face if this is desired.

A further modification is shown at 30 in Figure 4 wherein this shell is provided with an inner reinforcing cup or shell 32 which slidably fits into the outer shell 30, and is then held in position by means of a spun-down edge 34 of the outer shell. This provides a somewhat stronger structure, and it can be made oil-cooled or air-cooled by providing the inner washer or shell 32 with a series of slots or openings 36 as best illustrated in Figure 3.

In Figures 1 and 4, the packing 12 is shown as provided with a garter spring 38 or the like which is for the purpose of constricting the same about the shaft, but this spring may be omitted from certain shapes of packings or diaphragms such as, for example, the one shown in Figure 5 where the diaphragm structure itself is such that it hugs the shaft 18 sufficiently to produce a leak-tight seal even under severe conditions of use and rotation.

In Figure 6, the diaphragm or packing element 42 is held in position in the casing or shell 44 by means of the usual clamping ring 46, and in addition to this structure, there is also inserted in front of the packing element a further sealing device such as a ring of felt or the like 48 which is mainly for the purpose of preventing dust or grit from entering the bearing or seal from the outside. This felt ring can very feasibly be incorporated into the grease retainer construction by simply making a wider shell or housing 44, and then positioning the felt against an inner retaining washer or the like 50 which, together with the clamping ring 46 for the packing element, is then secured in position by means of indentations or the like 52 formed in the shell after which the felt ring 48 is added and a further retaining washer 54 of somewhat thicker metal is used to maintain the felt in position, this washer itself being retained in proper relationship to the rest of the parts by means of additional indentations or struck-out portions 56. In this way, a combination grease retainer or oil seal and dust excluding element is provided all in one structure.

A modified form of this arrangement is shown in Figure 7 wherein the packing element 62 is maintained in a shell 64 by means of the usual clamping or retaining ring 66, and a dust sealing ring of felt or the like 68 is then incorporated into the structure and maintained in position by means of a washer 70 L-shaped in cross section as shown and which washer is secured in locking position for all the elements by means of indentations of struck-out portions 72. It will be noted that the felt or other dust sealing element is so tightly squeezed into position by means of the retaining ring 70 that it conforms quite accurately to the external configuration of the packing ring or diaphragm 62, thereby reinforcing this ring and also providing an additional sealing structure forming a further safeguard against the possibility of leakage.

It will be evident that herein is provided a grease retainer or oil seal which is composed of a minimum of parts while still providing a very efficient and satisfactory structure and which, moreover, shall at all times produce a suitable reinforcing construction even under the most severe conditions of use, and on account of the fact that ready access of the oil or other liquid to be sealed can be had to the interior of the housing at all times, a certain amount of cooling results which insures a greater efficiency and longer operative use. The assembly is simple, particularly with packings or diaphragms molded so as to conform to the size and shape of the clamping or sealing ring 14 which is quite feasible with certain molded composition packing elements.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

1. A grease retainer for shafts, including an annular channel-shaped shell, an offet in the inner side of the shell, the shell having a central opening for the reception of a shaft therethrough, the sides of the channel being disposed substantially parallel to the shaft, a packing element therefor, and means for positioning the packing element in the offset of the inner face of the shell.

2. A grease retainer, including a channel-shaped shell, the shell having a central opening for the reception of a shaft therethrough, the sides of the channel being disposed substantially parallel to the shaft, a packing element therefor, and means for positioning the packing element against the inner face of the shell, said means comprising a clamping ring also positioned against said inner shell face.

3. A grease retainer, including a channel-shaped shell, the shell having a central opening for the reception of a shaft therethrough, the sides of the channel being disposed substantially parallel to the shaft, a packing element therefor, and means for positioning the packing element against the inner face of the shell, said means comprising a clamping ring L-shaped in cross section with its periphery against said inner face of the shell.

4. A grease retainer, including an annular shell channel-shaped in cross section, the shell having a central opening for the reception of a shaft therethrough, the sides of the channel being disposed substantially parallel to the shaft, a packing element therefor, and gripping means for positioning the packing element against one inner face of the shell, together with reinforcing means in the shell, said reinforcing means comprising a cup-shaped element fitted into the channel portion of the shell, one flange of the cup-shaped element extending into close proximity with the sealing edge of the packing element.

5. A grease retainer, including a channel-shaped shell, the shell having a central opening for the reception of a shaft therethrough, the sides of the channel being disposed substantially parallel to the shaft, a packing element therefor, and means for positioning the packing element in the inner face of the shell, said means comprising a clamping ring, and struck-out projections of the shell for fastening the clamping ring and packing in position against the inner face of the shell.

6. An oil seal for shafts, including a channel-shaped shell adapted to be fitted into a housing with one face thereof disposed opposite the shaft, a molded packing element therefor, and means for positioning the packing element in said opposed inner face of the shell, the open portion of the shell extending toward the body of oil to be sealed, and inwardly extending down-turned flanges adjacent both edges of said open portion.

7. An oil seal, including a channel-shaped shell adapted to be fitted into a housing, a molded packing element therefor, and means for positioning the packing element in the inner face of the shell, and reinforcing means for the shell, said reinforcing means comprising a cup-shaped element adapted to be fitted into the shell, and means in the cup-shaped element allowing free circulation of oil into and out of the shell, with a minimum contact of oil against the sealing element.

8. An oil seal, including a channel-shaped shell adapted to be fitted into a housing, a molded packing element therefor, and means for positioning the packing element in the inner face of the shell, and reinforcing means for the shell said reinforcing means comprising a cup-shaped element adapted to be fitted into the shell, and means in the cup-shaped element allowing free circulation of oil into and out of the shell, said means comprising slotted openings in the reinforcing cup.

9. An oil seal, including a channel-shaped shell adapted to be fitted into a housing, a molded packing element therefor, and means for positioning the packing element in the inner face of the shell, said means comprising a clamping ring of an acute angle in cross section, the packing element being of resilient material molded with its ring contacting portion of an internal diameter slightly less than the external diameter of the corresponding portion of the clamping ring, and sprung into position on the clamping ring.

10. A grease retainer and dust seal for shafts including a channeled annular shell, the sides of the channel being substantially parallel to the face of the shaft, a plurality of packing elements therefor, and means for positioning the packing elements against the inner face of the shell, said packing elements comprising a flexible diaphragm for oil-sealing purposes and a felt ring for dust sealing purposes, the positioning means including an L-shaped clamping ring for the oil seal element, and a washer L-shaped in cross section for the dust sealing element, said ring and washer seated in the inner face of the shell against the packing elements, the washer holding the clamping ring in position.

11. A grease retainer and dust seal for shafts including a channeled annular shell, the sides of the channel being substantially parallel to the face of the shaft, a plurality of packing elements therefor, and means for positioning the packing elements against the inner face of the shell, said packing elements comprising a flexible diaphragm for oil-sealing purposes and a felt ring for dust sealing purposes, the positioning means including an L-shaped clamping ring for the oil seal element, and a pair of flat washers for the dust sealing element, and outwardly struck projections for maintaining said positioning means in the inner face of the shell.

12. An oil seal, comprising a channel-shaped element adapted to be fitted into a housing and about a shaft, with the channel walls in substantial parallelism with the inner face of the housing and the axis of the shaft, an annular offset portion in the face of the inner wall of the housing, and a sealing element mounted in said offset portion and in sealing relationship with the shaft.

13. An oil seal, comprising a channel-shaped element adapted to be fitted into a housing and about a shaft, with the channel walls in substantial parallelism with the inner face of the housing, and the axis of the shaft, an annular offset portion in the face of the inner wall of the housing, and a sealing element mounted in said offset portion and in sealing relationship with the shaft, and means for fastening the sealing element in said offset portion, said means also forming a portion of the outer face of the seal.

JOSEPH A. ANTONELLI.
THOMAS O. KOSATKA.